Aug. 28, 1956     R. D. HULL ET AL     2,760,620

TURN TABLE CONVEYOR MEANS

Filed Aug. 13, 1952     2 Sheets—Sheet 1

INVENTORS.
RICHARD D. HULL
SEDDON C. NELSON

BY Carl A. Castellan
ATTORNEY.

United States Patent Office 2,760,620
Patented Aug. 28, 1956

2,760,620

TURNTABLE CONVEYOR MEANS

Richard D. Hull and Seddon C. Nelson, Fredericksburg, Va., assignors to American Viscose Corporation, Philadelphia, Pa., a corporation of Delaware Application August 13, 1952, Serial No. 304,138

1 Claim. (Cl. 198—25)

The present invention relates to material handling apparatus and more particularly to novel and improved apparatus for conveying one or more objects through a series of successive stations where various assembling and/or processing operations are automatically, semiautomatically or manually performed thereon.

In many of the present day manufacturing and processing operations it is customary to employ a suitable type of a conveyor system or the like to facilitate the delivery of an object or article to successive processing stations. Thus, for example, in the carton handling art it is oftentimes desirable and expedient to use a suitable conveyor for the delivery of the carton to the various successive packaging, sealing, stamping and other similar processing stations. Although various types of conveyor systems and the like have been devised and employed in the past for such purposes, they have oftentimes been found to be impracticable due to a lack of ample space therefor.

It is a principal object of the present invention to provide a novel and improved material conveyor device which is constructed in a unique, relatively compact manner so as to conserve space and permit its use in relatively confined areas.

Other objects and advantages of the invention will be apparent from the following description.

In the drawing which is illustrative of the invention,

In general the improved object or carton conveying device of the present invention comprises a turret with a plurality of object or carton supporting means spaced about its periphery, means positioned adjacent a point on the periphery of the rotary path of the turret and the object supporting means for depositing objects thereon, and means positioned adjacent another point on the periphery of the said rotary path for discharging the objects from the object supporting means. It has been found that objects or cartons upon which a series of processing operations are to be successively performed may be conveniently handled in such a manner with a maximum conservation of space.

Figure 1:
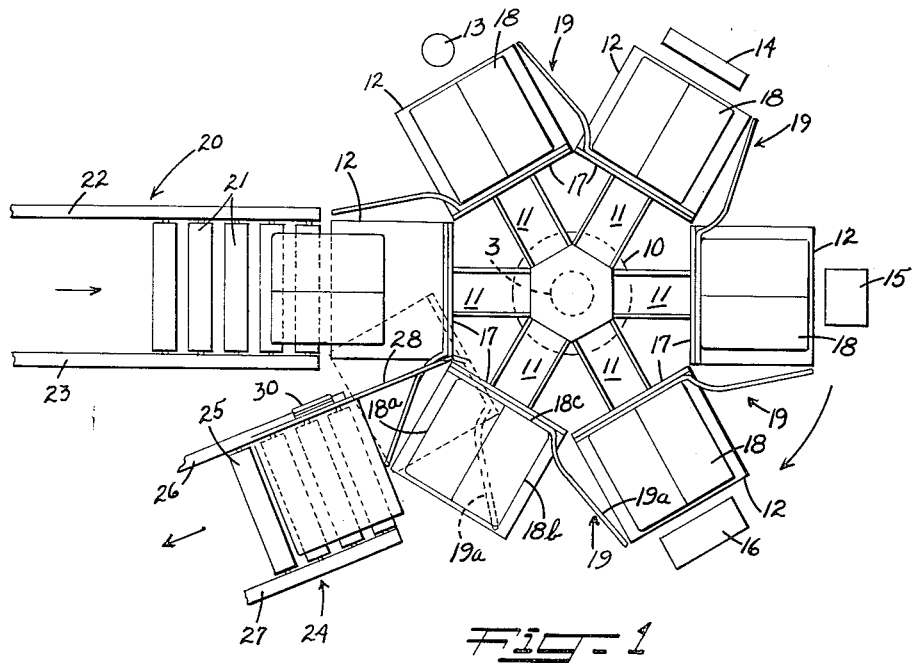
Figure 1 is a plan view of a preferred embodiment of the present invention.
Figure 2:
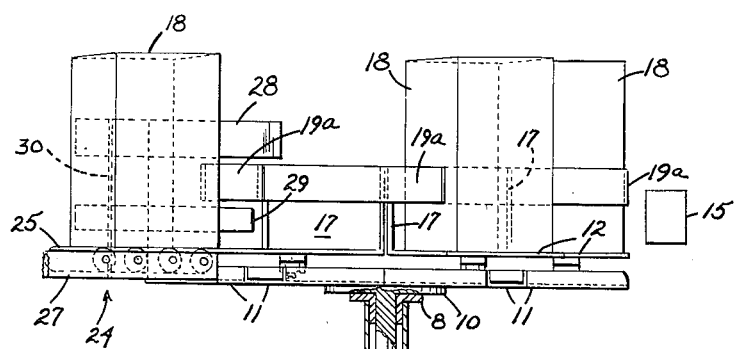
Figure 2 is a front elevational view of the embodiment of the invention shown in Figure 1.
Figure 3:
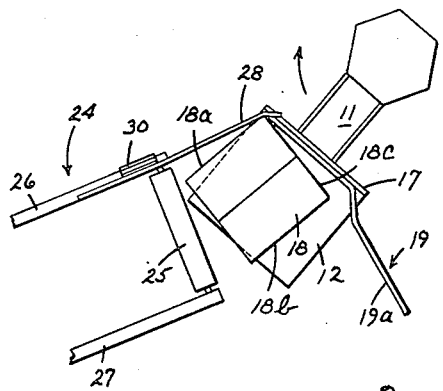
Figures 3–6 are fragmentary views similar to Figure 1 but showing progressively the discharge positions of a carton.
Figure 4:
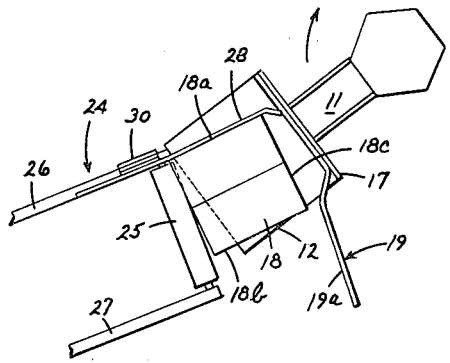
Figure 5:
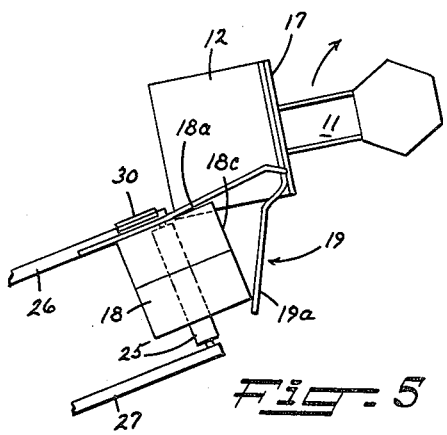
Figure 6:
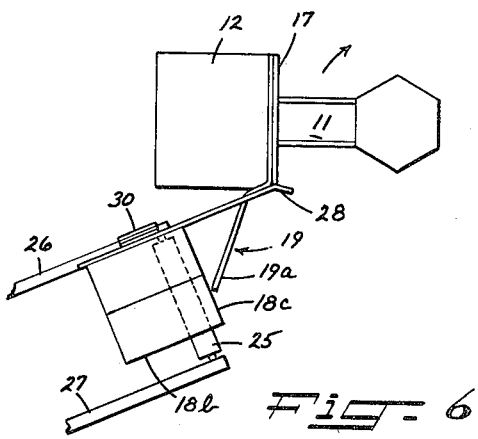
Figure 7:
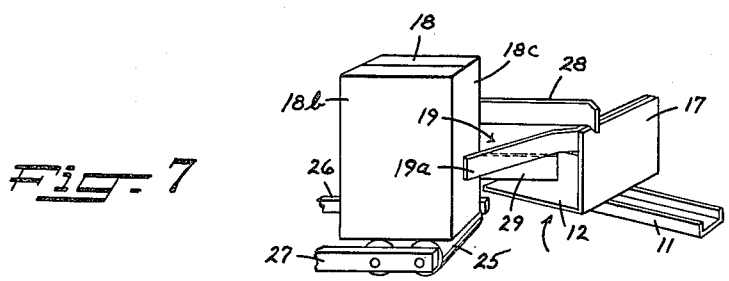
Figure 7 is a perspective of the apparatus in the position of Figure 6.

A preferred embodiment of the present invention is shown in Figures 1 and 2 of the drawing. As illustrated therein the tubular post member or pipe 3 is preferably supported in a vertical manner by the radially disposed channel members 4 which are secured to the post member in any suitable manner such as by the welding shown at 5. The brace members 6 which extend angularly as shown between middle portions of the channel and post members are preferably provided to add rigidity to the structure.

The shaft member or the like 7 is positioned in the tubular post 3 where its rotation therein is facilitated by the sleeve bearing 8 and the thrust bearing 9. The plate member or the like 10 is secured to the exposed upper extremity of the shaft 7 in any conventional manner and provides a means of support for the radially disposed channel members or the like 11 which are preferably welded thereto. The generally rectangular plates or platforms 12 are secured to the extremities of the radially disposed channel members 11 and, as will be more apparent hereinafter, provide a means for receiving any suitable object or the like and conveying the same to the successive processing stations which are generally designated in the drawing by the reference numerals 13, 14, 15 and 16.

The inner edge of each of the platforms 12 is provided with an upstanding plate member or backrest 17 which, as will be more apparent hereinafter, permits a proper orientation and positioning of the objects 18 thereon. The "sweep" guides or cams 19, which are preferably secured in any suitable manner such as by welding to the upstanding plate members 17, extend preferably in the manner shown in Figure 1 of the drawing angularly from the inner edge of the upstanding plate member of the associated platform 12 toward the periphery of its rotary path about the axis of the shaft 7. As will be more apparent hereinafter, the angle between the trailing edge of the platform and the projection on the plane of the platform of the extended portion of the associated "sweep" guide is formed such that removal of the objects or cartons 18 may be easily and readily effected.

The conveying means, which is generally designated in the drawing by the reference numeral 20 and which preferably includes a plurality of roller members 21 which extend between the conveyor frame members 22 and 23, is suitably positioned adjacent a point on the rotary path of the platforms about the axis of the shaft 7 such that the objects 18 may be readily transferred to or deposited thereon. In a similar manner the discharge conveyor which is generally designated in the drawing by the reference numeral 24 and which preferably includes a plurality of roller members 25 which extend between the conveyor frame members 26 and 27 is suitably positioned such that the objects 18 may be automatically discharged from the platforms 12 in a manner which will be more fully described hereinafter.

The horizontally disposed barrier members 28 and 29 are preferably secured to the upstanding support plate or the like 30 in any convenient manner and are adapted to cooperate with the sweep guides 19 in a manner which will be described more fully hereinafter such that upon rotation of the rotatable member 7 the objects 18 are automatically discharged onto the conveyor 24.

In operation, each of the objects 18 such as cartons or the like, which is to be delivered successively to the various processing stations 13, 14, 15 and 16 in accordance with the present invention is moved along the conveyor 20 either manually, gravitationally, automatically or otherwise toward one of the platforms 12 which has been properly aligned in any suitable manner with the extremity thereof. After an object or carton 18 has been properly deposited on the aligned platform, it is conveyed upon rotation of the rotatable member to the various successive processing stations where any suitable series of operations are performed thereon. As the platform 12 and the carton or the like 18 approach and become aligned with the discharge conveyor 24, the barrier members 28 and 29 engage the lateral surface 18a of the carton and restrain its further movement about the axis of the shaft 7. As the platform, however, continues to rotate and move past the discharge conveyor, the properly extended portion of the associated "sweep" guide 19 engages the opposite and inner lateral surfaces 18b and 18c of the carton and urges the same outwardly onto the roller members 29 of the discharge conveyor. Thereafter the carton is conveyed manually, gravitationally, automatically or otherwise to any other suitable location. As best shown in Figure 2 of the drawing during the continued rotation of the conveying device of the present invention, the sweep guide 19 passes between the suitably spaced barrier members 28 and 29 and the emptied platform is then ready to receive another carton or the like 18 from the conveyor 20 and conduct the same through a similar processing cycle.

So as to insure proper removal of the objects or cartons 18 from the platforms 12, each of the "sweep" guides 19 is adapted to contact its carton when the extended portion 19a thereof is oriented at a critical or greater than critical angle with the barrier members 28 and 29. The magnitude of the said critical angle which is largely dependent upon the size of the carton and the coefficient of friction between the surfaces of the carton and barrier members ordinarily lies between 25 to 50 degrees.

It is to be understood, of course, that each of the other platforms are simultaneously conducting other cartons through the same cycle so that in the illustrated embodiment six cartons may be handled at the same time. It is to be also understood that although the conveyor device of the present invention, as shown and described herein is adapted to accommodate six cartons, any greater or lesser number of platforms could be provided radially about the rotatable member to accommodate any desired number of cartons without departing from the spirit or scope of the present invention.

Furthermore, though not shown on the drawing, any suitable and convenient device such as a ball and detent mechanism or the like associated with the rotating shaft 7 could be used to facilitate a proper alignment of the various platforms with the conveyor 20 during the loading operation thereof without departing from the spirit or scope of the present invention.

While preferred embodiments of the invention have been disclosed, the description is intended to be illustrative only and it is to be understood that changes and variations may be made without departing from the spirit and scope of the invention as defined by the appended claim.

We claim:

Article conveying apparatus including a rotatable turret assembly having a plurality of radially extending members, a rectangular article supporting platform secured to the outmost end of each of said members, a backrest on each platform against which an article is adapted to engage, said platforms being spaced peripherally relative to each other, an article loading conveyor having a first longitudinal axis and adapted to sequentially deliver a rectangular article onto each of said platforms against its backrest in a first position wherein a pair of sides of the rectangular article are disposed approximately parallel to said first longitudinal axis, an article receiving conveyor having a second longitudinal axis and adapted to receive the rectangular article sequentially discharged from each of said platforms in a second position wherein a pair of sides of the rectangular article are disposed approximately parallel to said second axis, said first and second axes extending along vertical planes intersecting at a point offset from the axis of the turret assembly, a stationary abutment positioned adjacent to the article receiving conveyor and extending over and across the rotary path of said platforms in a direction approximately parallel to said second axis, said abutment having a free end disposed over and beyond the rotary path of said backrests and being offset along a vertical bend line toward said second axis, said abutment being adapted to cause each of the rectangular articles to pivot from said first position into said second position when a corner portion of the article is positioned against said vertical bend line and said turret assembly is rotated, and a sweep guide mounted on each of said backrests above the plane of said platforms and extending outwardly and rearwardly from the backrest into the space between the trailing and leading edges of adjacent platforms, each of said sweep guides being adapted to engage with the rectangular article carried by its respective platform after the article has been pivoted into said second position by said abutment and to project the article along said second axis and onto said article receiving conveyor as said turret assembly is rotated.

References Cited in the file of this patent
UNITED STATES PATENTS

| | | |
|---|---|---|
| 1,444,359 | Rand | Feb. 6, 1923 |
| 1,981,641 | Benoit | Nov. 20, 1934 |